United States Patent

[11] 3,629,814

| [72] | Inventor | Bruce W. Klein<br>South Bend, Ind. |
|---|---|---|
| [21] | Appl. No. | 11,987 |
| [22] | Filed | Feb. 17, 1970 |
| [45] | Patented | Dec. 21, 1971 |
| [73] | Assignee | The Bendix Corporation |

[54] DISK BRAKE ROTOR SCRAPER AND WEAR INDICATOR MEANS
1 Claim, 2 Drawing Figs.

[52] U.S. Cl. ............................................. 340/52 A,
15/256.5, 188/1 A, 200/61.19, 200/61.44
[51] Int. Cl. ....................................................... F16d 66/02
[50] Field of Search ............................................ 340/52, 69;
188/1 A; 15/251 A, 256.5, 256.51

[56] References Cited
UNITED STATES PATENTS

| 1,902,759 | 3/1933 | Cataudella .................... | 340/52 A |
| 1,980,227 | 11/1934 | Repony ......................... | 188/251 A UX |
| 2,061,919 | 11/1936 | Nanfeldt ....................... | 188/251 A UX |
| 2,217,176 | 10/1940 | Madison ....................... | 340/52 A UX |
| 2,496,699 | 2/1950 | Clark ............................ | 188/71.1 |
| 2,619,442 | 11/1952 | Shippee ........................ | 188/251 A X |
| 3,088,549 | 5/1963 | Borsa ........................... | 188/1 A |
| 3,473,631 | 10/1969 | Schmid ......................... | 188/73.3 |

FOREIGN PATENTS

| 108,888 | 6/1899 | Germany ...................... | 15/256.51 |

*Primary Examiner*—Thomas B. Habecker
*Assistant Examiner*—Kenneth N. Leimer
*Attorneys*—Plante, Hartz, Smith and Thompson and Raymond J. Eifler

ABSTRACT: A scraper apparatus for the rotor of a disk brake commonly used for general automotive application which also serves as a scraper wear indicator.

PATENTED DEC 21 1971

3,629,814

BRUCE W. KLEIN
INVENTOR.

BY
W. S. Thompson

DISK BRAKE ROTOR SCRAPER AND WEAR INDICATOR MEANS

FIELD OF THE INVENTION

The present invention relates generally to the art of disk brake systems and more particularly to a disk brake system used in automotive applications.

DESCRIPTION OF THE PRIOR ART

The prior art teaches that automotive disk brake systems utilize splash shields to protect the rotors from road splash. The splash shield is mounted so as to protect the inboard surface of the rotor. The outboard surface of the rotor is protected from direct splash by the wheel. The splash shield was thought to be an integral and necessary part of the disk brake system since the shield prevented contaminants from reaching the disk brake's rotor. The splash shield, however, no matter how designed, had to be mounted close to the rotor in order to be effective; because of its close proximity to the rotor, the shield restricted and substantially reduced conduction and radiation cooling of the rotor.

Due to the weight of the domestic passenger car, the typical driving speeds, and the fact that disk brakes generally run hotter than drum and shoe-type brakes at the time of braking, the occurrence of operation at or near the critical temperature is uncomfortably frequent. The presence of the splash shield, which retards cooling of the rotor, contributes to this already inherent disadvantage in the disk brake system. As the temperature of the disk pads approaches the critical temperature, the effectiveness of the friction pads drops and the braking torque generated by the disk brake system decreases by 25 to 50 percent.

The prior art as represented by recently issued U.S. Pat. NO. 3,473,631 teaches the use of a scraper blade for removing "gross layers" of contaminants from the rotor of a disk brake. However, said prior art teaches metal to metal contact of scraper blade and rotor. This condition of metal to metal contact creates two inherent disadvantages which makes its use undesirable for most automotive applications, i.e., (1) offensive and unnecessary noise, and (2) rapid rotor wear and/or scoring at high speeds and temperatures. Further, the scraping of the rotor by a metal blade necessitates a simultaneous "polishing" step by a separate polishing member to remove the score marks.

Another disadvantage existing in the prior art is the gradual deterioration of the rotor due to corrosion caused by road salt which corrosive action begins at the outside perimeter of the rotor. This corroding action was not prevented since the prior art does not teach a wiped path that at least equals the radial width of the inboard machined surface of the rotor.

The prior art also teaches the setting of contact points within the lining material of brake shoes (or disk pads) so as to electrically indicate lining wear. These contact points were set so as to give a signal when the lining wear had reached a predetermined point. This method has proven unreliable since it is difficult to locate the contact points at the required predetermined depth within the lining material. This system has also proven quite expensive because of the required method of manufacture. Further, this wear-indicating means requires physical contact of the electrical contact points with the brake drum and/or rotor; this metal-to-metal contact could cause scoring of the brake drum or rotor. The above-listed disadvantages of the present wear indicator means has proven that such means is commercially unfeasible.

BRIEF SUMMARY OF THE INVENTION

The desired objectives of the present invention are realized by removing the aforesaid splash shield from the disk brake system and replacing said splash shield with a rotor-scraping device. The present invention serves the purpose of the splash shield, i.e., protect the inboard rotor surface from contaminants, and simultaneously serves as a scraper wear indicator.

The invention is characterized by a resilient steel member which is mounted at one end to a fixed support means, e.g., the brake support housing. The other end of the steel member is fastened to a small slab of low-friction material brake lining and serves as the scraper. By eliminating the splash shield both the brake friction pad temperature and the rotor temperature are significantly reduced; by thus increasing the effectiveness and reducing the wear of the friction pads, the braking torque and service life of the friction pads are correspondingly increased.

Another object of the present invention is to scrape the entire radial width of the inboard machined surface of the rotor so as to prevent deterioration of the rotor by corrosion which begins at the other perimeter of said rotor.

It is a further object of the present invention to eliminate unnecessary noise and to eliminate the necessity for polishing the rotor by utilizing a scraper composed of a low-friction highly wear-resistant material containing a high quantity of rubber scrap or other elastomeric material.

A wire is connected between the resilient steel member and an indicator (e.g., a light bulb) which wire has as its power source the automobile battery. When the scraper is worn sufficiently the steel member comes in contact with the outer edge of the rotor; since the rotor is grounded, an electrical circuit is completed and the indicating means is actuated. The driver is thereby warned of scraper wear. Unlike prior art, the use of this nonelectrically conductive friction material provides for a novel scraper wear warning system. By permitting a completed electrical circuit (i.e., metal-to-metal contact of rotor and scraper arm) only when the scraper needs replacing, the benefits obtained from the above and other objects of the present invention are extended indefinitely.

Furthermore, the scraper material and spring member tension are selected so that the scraper wears out somewhat in advance of the disk pad material. Thus a secondary but important feature is obtained in that the scraper wear warning system also serves as a disk pad wear indicator. Unlike prior art teachings, however, the disclosed method of indicating disk pad wear in inexpensive, prevents scoring of the rotor in the path traversed by the disk pads, and is much more reliable.

It would be obvious to one learned in the art that the present invention is not only of greater utility to general automotive applications, but also is far less complicated and less expensive than any rotor-scraping means present in the art.

DESCRIPTION OF THE PREFERRED EMBODIMENT

Figure 1:
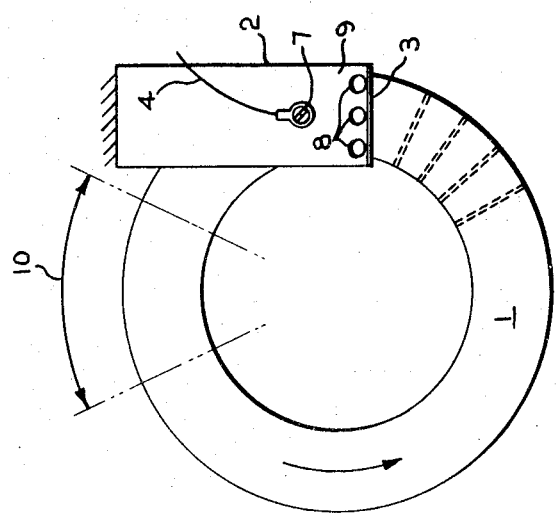
FIG. 1 is a plan front view illustrating the relationship of the rotor wiper to the inboard side of the disk brake rotor.

Referring to FIG. 1, a typical ventilated disk brake rotor 1 is shown from the inboard side of an automobile. A scraper arm 2 preferably manufactured from resilient steel, is mounted to a stationary part of the car chassis, e.g., the brake support housing, indicated generally as the caliper area 10. Since the scraper arm 2 is electrically charged by a wire 4, the scraper arm 2 must be electrically insulated from the brake support housing. A method of insulating the scraper arm 2 from the brake support housing may be by inserting a commercial insulating material, for example, a piece of phenolic linen, between the scraper arm 2 and the housing at the area where arm 2 is mounted to the housing. Any conventional method of mounting arm 2 to the car chassis may be used.

Assuming the direction of rotation of rotor 1 on the drawing is counterclockwise, the scraper arm 2 is positioned so that the scraper end 9 of scraper arm 2 is located immediately prior to the caliper area 10. Scraper arm 2 is a spring member tensioned so as to apply a relatively evenly distributed load to scraper 3 along the radial line where scraper 3 is in contact with rotor 1; scraper 3 is attached to the scraper end 9 of the scraper arm 2. Scraper 3 extends approximately one-eighth inch beyond the radial width of rotor 1 on both the inside and outside edges of said rotor.

Figure 2:
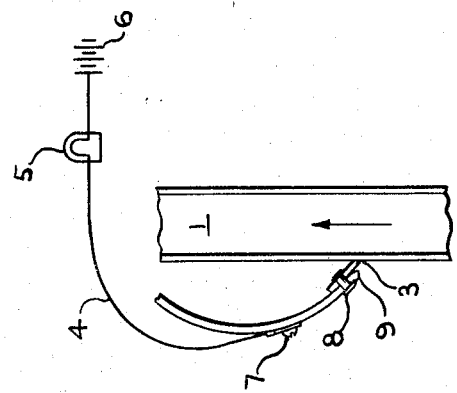
FIG. 2 is a fragmentary side elevation illustrating the electrical layout and wear indicating means.

Referring now to FIG. 2, scraper 3, preferably a low-friction organic brake lining, is fastened to scraper arm 2 by rivets 8; however, several other methods may also be used, e.g., a set of clips attached to scraper arm 2 could hold scraper 3, or scraper 3 could slide into a slot machined into scraper arm 2. Scraper 3 extends slightly beyond the scraper end 9 of scraper arm 2 and is in contact with rotor 1 due to the load (24–40 oz.) applied to it by scraper arm 2. The preferred configuration of scraper 3, is rectangular with the width approximately four times the height and approximately 0.200 inches thick.

Scraper 3 contains a high quantity (10 percent by volume or more) of elastomeric material such as natural or synthetic rubber, said elastomeric material being part of the scraper composition in order to eliminate any rotor-scraper noise. Scraper 3 is, of course, electrically nonconductive. The composition and configuration of scraper 3 is such that it will wear out prior to the disk pads of the system in which it is a component. The relative wear rates between the scrapers and the disk pads is currently under determination. Recent experimentation on dynamometers and test cars indicates: (1) minimal wear at 70 m.p.h., *brakes off;* and (2) maximum scraper wear of 0.26 inches for 4,000 miles of general service and severe fade testing on a vehicle which produced 0.075 inches maximum disk pad wear.

With the wear rates of the disk pads determined under several vastly varying braking conditions, the wear rate for "-normal" driving conditions can be closely estimated. Thus with the scraper wear also previously determined for a specific low-friction material composition, the required thickness of the scraper can be so chosen as to wear out just prior to the disk pads of the braking system in which said scraper is used. This novel approach for indicating disk pad wear is inexpensive in that it can be adapted to any existing braking system without the necessity for redesigning the disk pad and/or activating mechanisms. Also, it is much more reliable since the complicated and expensive manufacturing step of locating electrical contacts within the brake lining has been eliminated.

Referring to FIG. 2, the scraper wear indicating means is shown. An electrically conductive wire lead 4 is connected to the scraper arm 2 by a bolt 7; of course, any like means of attaching the lead 4 to the scraper arm 2 may be used. An electrical sensing device, e.g., the indicator light 5 is connected to the lead 4, which lead 4 is also connected to the automobile's battery. The indicating light 5 could be made an integral part of the warning panel of an automobile's dashboard. Different bulbs may be used for each scraper.

OPERATION OF PREFERRED EMBODIMENT

As rotor 1 rotates it may come into contact with contaminants thrown about by the splash caused by the tire on the wheel to which it is attached and/or other wheels of the automobile. If the contaminant sticks to the rotor 1 it will eventually come into contact with the scraper 3; upon contact with scraper 3, the contaminant will be separated from the rotor 1 and fall to the road pavement. Since scraper arm 2 is positioned just prior to the disk pads, rotor 1 will be scraped clean when it enters the disk brake assembly located at the caliper area 10. (The disk pads are housed inside the brake assembly located at caliper area 10.)

Since scraper 3 is forced flush to rotor 1 and since the surface speed is greater at the outside diameter of rotor 1, after extended usage that section of scraper 3 that is in contact with the outside edge or rotor 1 will wear at the greatest rate. Therefore, when scraper 3 is sufficiently worn, steel scraper arm 2, which is connected to the wear indicator 5 and supplied with electrical current from battery 6 through lead 4, will come into contact with the outside edge or rotor 1. Since rotor 1 is grounded (i.e., in contact with the automobile chassis), the contact of scraper arm 2 with rotor 1 completes a circuit thereby causing indicator light bulb 5 to light up giving the driver notice that the scraper must be replaced and that the disk pads should also be checked for wear.

When the scraper is replaced, new disk pads may also be installed thereby starting a new cycle. Unlike prior art, however, the low-friction scraper composition leaves the rotor unscored. Also, the present method of indicating disk pad wear is, as noted, inexpensive and much more reliable. Even more important is the fact that the entire inboard machined surface of the rotor has been scraped clean preventing contaminating material from corroding the rotor from the edges inward. Of course, elimination of metal-to-metal contact of scraper and rotor allows the present invention to be used for general automotive braking systems where the prevention of noise is a key design factor.

It is to be noted that along with accomplishing the above-cited favorable objectives, the low-friction material scraper is effective in removing all road contaminants normally encountered along with achieving the desired rotor service life. This latter feature of the present invention is a surprising and unobvious result for a structurally weak material such as organic low-friction material when compared with the prior art metal scrapers previously thought necessary.

Finally, the use of a rotor scraper provides a means for performing the function of splash shield while simultaneously achieving all the benefits gained by omitting the splash shield from the general automotive disk brake system.

I claim:

1. In combination with a disk brake apparatus wherein there is a rotor having an inboard and outboard surface, and a plurality of friction material pads arranged to contact said inboard and outboard rotor surfaces, the improvement which comprises:
   a fixed support means;
   a resilient scraper arm mounted to said fixed support means, said arm being biased toward the rotor surface and comprised of an electrically conducting material;
   a low-friction organic material scraper attached to said scraper arm so that said arm forces said scraper in contact with the inboard rotor surfaces, said organic material electrically nonconductive and normally spacing said scraper arm from said rotor surface;
   an electrical device for indicating scraper wear;
   an electrical power source for energizing said electrical device; and
   a wiring means for interconnecting said electrical device, said poser source, said scraper arm and said rotor whereby an electrical circuit would be completed and said indicating device would be activated when said scraper arm comes in contact with said rotor.

* * * * *